United States Patent [19]

Mead

[11] 4,162,796
[45] Jul. 31, 1979

[54] TANK MOUNTING APPARATUS FOR TRACTORS

[75] Inventor: Harold C. Mead, Charles City, Iowa

[73] Assignee: Nixdorff Krein Industries, Inc., St. Louis, Mo.

[21] Appl. No.: 882,779

[22] Filed: Mar. 2, 1978

[51] Int. Cl.² .............................................. B60P 3/22
[52] U.S. Cl. .................................... 280/5 R; 280/400
[58] Field of Search ...................... 280/5 R, 5 A, 400; 239/149, 172

[56] References Cited

U.S. PATENT DOCUMENTS

| 818,217 | 4/1906 | Anderson | 280/5 |
|---|---|---|---|
| 2,596,473 | 5/1952 | Essick | 280/5 X |
| 2,637,594 | 5/1953 | Spedding | 239/149 X |
| 2,680,624 | 6/1954 | Pool et al. | 280/5 |
| 3,488,061 | 1/1970 | Hansen | 280/5 R |
| 3,650,501 | 3/1972 | Streb | 280/5 R |
| 3,665,130 | 4/1972 | Patrick | 239/172 X |
| 3,792,814 | 2/1974 | Platz | 280/149 |
| 3,900,201 | 8/1975 | Johnson | 280/5 H |

Primary Examiner—John A. Pekar
Attorney, Agent, or Firm—Kalish & Gilster

[57] ABSTRACT

Apparatus for mounting a spray tank or other container upon a four-wheel drive tractor having a three-point lifting hitch at the rear. The apparatus includes an upright frame adapted for attachment to said hitch when lowered and a horizontal second frame pivotally supported proximate one end by a pivot structure to the upper end of the upright frame for rotation about an upright pivot axis. The second frame supports the tank with its center of gravity spaced from the pivot axis so that the center of gravity may be relocated with respect to the hitch, when raised, upon rotation of the horizontal frame about the pivot axis. Hence, the tank center of gravity may be relocated forward of the hitch for vastly improved weight distribution.

23 Claims, 10 Drawing Figures

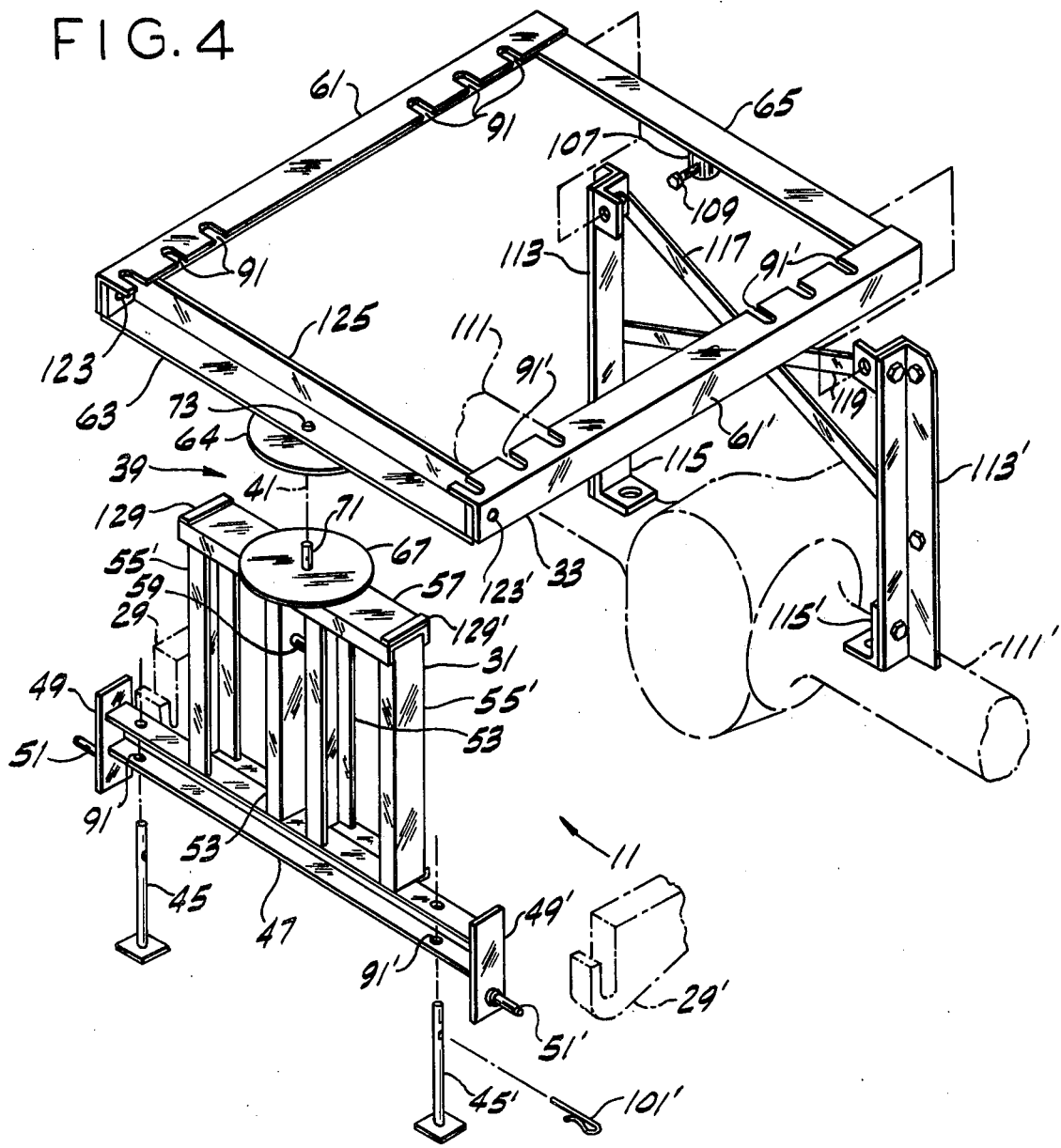

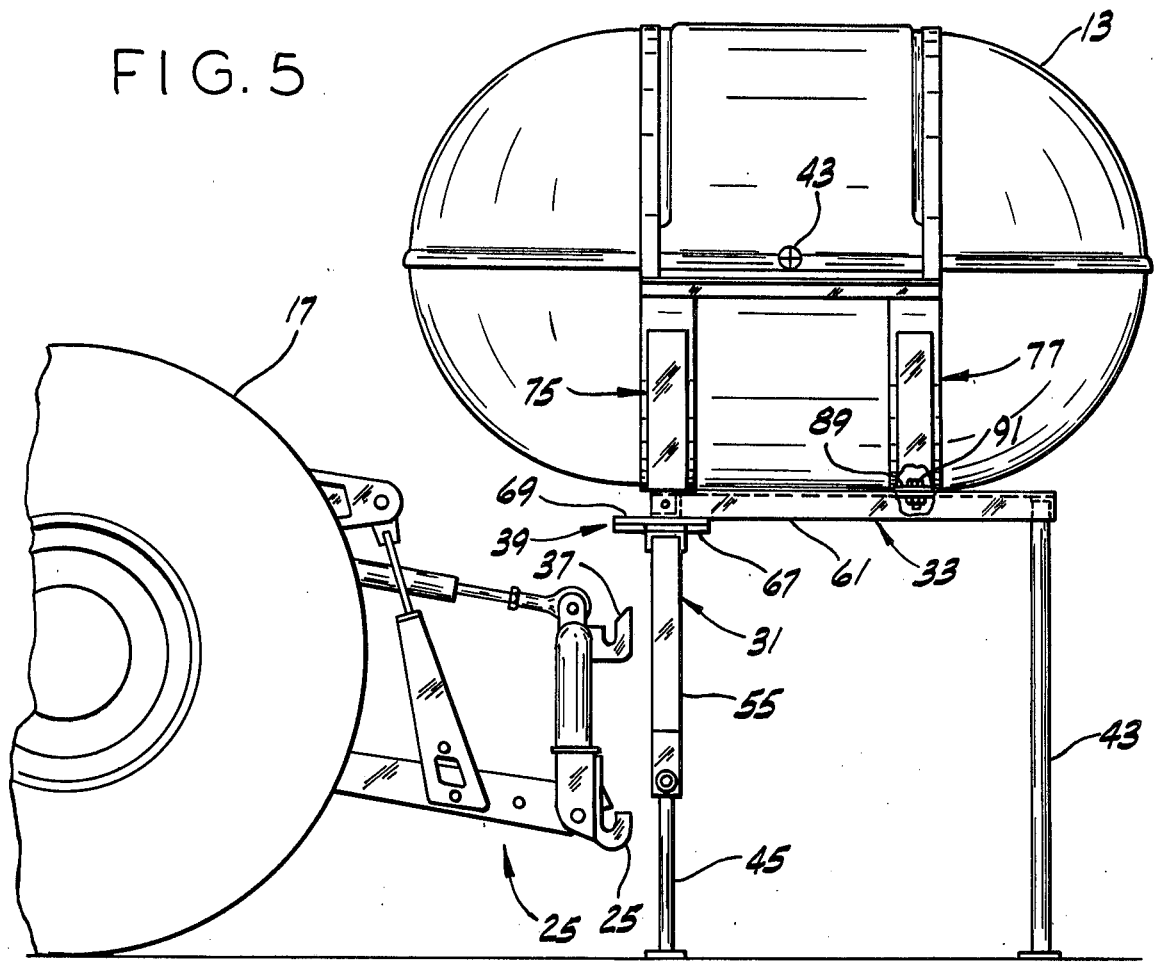
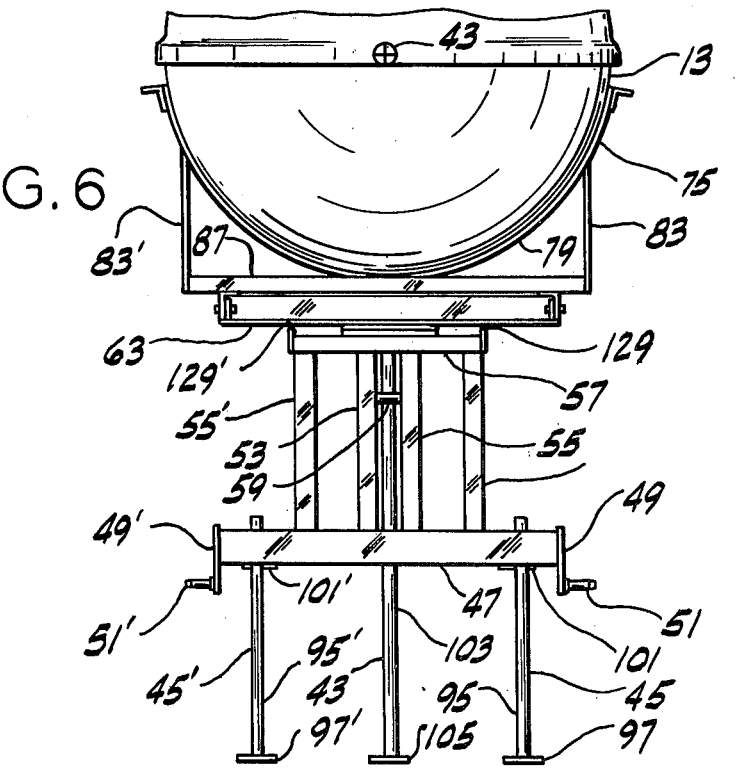

TANK MOUNTING APPARATUS FOR TRACTORS

BACKGROUND OF THE INVENTION

The present invention relates to apparatus for mounting a spray tank or container upon a tractor and, more particular, to a new structure for mounting such tank or container upon a tractor by means of a lifting hitch of the tractor.

Agricultural or so-called farm tractors are conventional of either two-wheel drive or four-wheel drive types. In the former type, large diameter rear wheels drive the tractor, the operator seat and possibly a cab enclosure for the operator being located generally above the rear axle. In the latter type, both front and rear wheels drive the tractor, the operator cab enclosure being typically centrally located.

Such four-wheel drive tractors are employed for extremely heavy duty service and typically have the engine located in front of the cab, there being a rear mounted lifting hitch extending rearwardly from the tractor for raising or lowering various farm implements designed to be attached to the hitch, such as plows, disc harrows, planters, cultivators and the like.

Such hitches are conventionally a three-point configuration, i.e., have three points of attachment for an implement, the hitch being selectively controllable for being raised or lowered to a desired extent by means of hydraulic power, for example.

The present invention is intended primarily for use on such four-wheel drive tractors, owing to their configuration, size and other factors more fully evident from the following description. However, it is not intended that use of the invention be so limited.

In the use of tractors, regardless of type, having a three-point hitch at the rear, the weight of any apparatus carried behind the hitch such as a plow or other implement carried by the hitch exerts a rearward moment about the rear wheels. In other words the rear wheels act as a fulcrum so that heavy hitch-mounted loads cause the front of the tractor to be very light, possibly adversely affecting the steering. In the case of a four-wheel drive tractor the light loading of the front wheels may prevent them from pulling a full share of the load.

In some cases it is necessary to add weight at the front of the tractor to increase the loading upon the front wheels so as at least to provide for adequate steering.

In the use of tractors of the present type for spraying of herbicides, fertilizers and other liquids, it is now often desired to employ tractor-mounted sprayer tanks having high capacity, for example, 500 gallons. Since the density of spray liquids may approximate ten pounds per gallon, an enormous weight must be borne by the tractor. Hence, concern must be given to weight distribution, particularly when using four-wheel drive tractors, so that all four wheels adequately share in propelling the tractor.

Thus, it is important that the front wheels have sufficient traction. But the mounting of a high capacity spray tank by means of the hitch with the tank center of gravity rearward of the hitch may preclude adequate traction because of the large rearward moment about the rear wheels resulting from a long moment arm and high weight.

In the past, it has been necessary to add weight to the front of the tractor to counterbalance this rearward moment, as by adding additional spray tanks at the front.

Some four-wheel drive tractors are of an articulated type in which the front and rear portions of the tractor are joined by a hinge-like structure as joint located centrally of the tractor. Turning of the tractor is made possible by articulation about this joint. It will be understood that heavy rear-mounted weights, such as a large spray tank carried rearwardly of the hitch, will provide a large bending moment about such joint. This may cause undue strain or wear of the joint and articulation mechanism with consequent damage or shortening of the life of this very expensive type of tractor.

Present arrangements for tractor mounting of spray tanks therefore limit the capacity of the tanks which can be used, require use of additional weights at the front of the tractor, or contribute to problems of the type described.

SUMMARY OF THE INVENTION

Among the objects of the present invention may be noted the provision of an improved apparatus for mounting a container upon a tractor having a lifting hitch.

Another object of the invention is the provision of such apparatus particularly well-suited for use with a tractor having a three-point hitch extending rearward from the tractor, and particularly such a tractor of the four-wheel drive type.

Another object of the invention is the provision of such apparatus for mounting a large capacity container such as a spray tank upon the tractor by means of such hitch, and particularly utilizing the lifting capability of the hitch.

A further object of the invention is the provision of such apparatus for mounting a large capacity spray tank or other container upon the tractor through use of such hitch but which minimizes the rearward moment of the tank or container about the rear wheels so as to keep sufficient weight on the front wheels for adequate steering and so as to ensure that the front wheels pull their share of the load.

A still further object of the invention is the provision of such apparatus which permits mounting of a large capacity spray tank or other container upon the tractor in such a configuration that bending moment exerted upon the tractor is minimized, and particularly is advantageous in this respect when utilized with articulated type tractors.

A related object of the invention is the provision of such apparatus which permits part of the weight of a heavy spray tank or other container to be borne by the rear axle of the tractor.

Yet another object of the invention is the provision of such apparatus which greatly facilitates mounting of a spray tank or other container upon such a hitch-equipped tractor, permitting the same to be quickly accomplished in a most facile, convenient manner, and without need for the operator to personally lift heavy apparatus.

Among still other objects of the invention may be noted the provision of such apparatus which is adapted for use with various different models of tractors, which is of durable, economical and relatively simple construction, and which minimizes the need for bulky, heavy and expensive bracing structure.

Other objects and features will be in part apparent and in part pointed out herein below.

BRIEF DESCRIPTION OF THE DRAWINGS

FIG. 4 is an exploded perspective view of the new apparatus depicting the relative positioning of its component parts relative to structure of the tractor.

FIG. 5 is a side elevation of the new apparatus supporting a spray tank and partly broken away to show certain tank support features thereof, and illustrating also in greater detail the tractor hitch positioned for attachment of the apparatus.

FIG. 6 is a front end elevation of the apparatus and portions of the tank viewed as approached from a tractor upon which the tank is to be mounted by picking up the apparatus with the tractor hitch.

Corresponding reference characters indicate corresponding parts throughout the several views of the drawings.

DESCRIPTION OF THE PREFERRED EMBODIMENT

Figure 1:
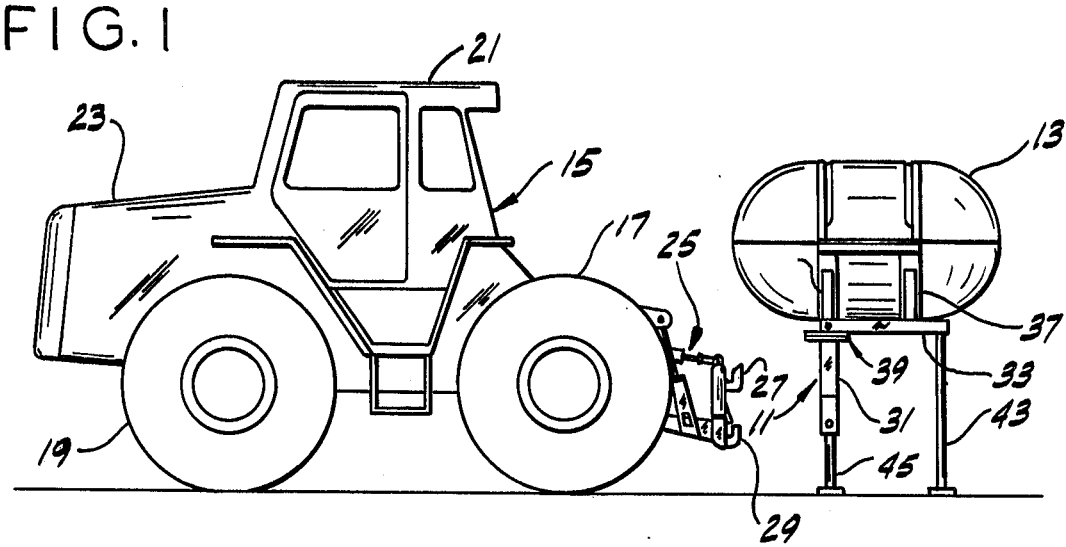
FIG. 1 is a side elevation of apparatus of the invention shown supporting a spray tank and of an agricultural tractor having a lifting hitch shown positioned for attachment thereto of the apparatus.

Referring now to the drawings and particularly to FIG. 1, apparatus of the invention is generally designated 11. The apparatus is intended for mounting a large capacity spray tank 13 upon a heavy duty agricultural tractor generally designated 15 of four-wheel drive configuration. The tractor is driven by power supplied to not only the rear wheels 17, 17', but also to the front wheels 19, 19' of the tractor. In this type of tractor, the operator is seated in a centrally located cab 21. The engine is located forwardly of the cab in a front portion 23 of the tractor.

Located behind cab 21 and extending rearwardly from the tractor is a three-point lifting hitch designated generally at 25. Said hitch 25 is of conventional configuration having mutliple points of attachment constituted by lifting members or hooks designated at 27 and 29. There are conventionally three such hooks, two lower hooks 29, 29' (See FIG. 10) being oppositely disposed and a single upper hook 27 being located above but laterally centered between the lower two hooks 29, 29' (See FIG. 10). Such hooks may have a remotely controlled latching mechanism (i.e., controlled from cab 21 by the operator), the hitch being then a so-called "quick-hitch".

Hitch 25 is of the lifting type adapted for raising or lowering various farm implements designed to be attached to the hitch, such as plows, disc harrows, planters, cultivators and the like. The hitch can be selectively raised or lowered by remote control from the operator position within cab 21 by means of a hydraulic lifting mechanism (not shown) or its equivalent, movement of the hitch being, of course, primarily vertical.

The new apparatus permits the tank center of gravity to be relocated relative to the tractor hitch upon securing the apparatus to the hitch so as to minimize adverse weight of the tank upon the tractor when the tank is filled with a heavy amount of liquid. The new apparatus provides an efficacious, unusual and hitherto unsuggested combination of features.

Briefly, the new apparatus includes an upright frame 31 adapted for attachment to hitch 25 by means of engagement of the hook members 27 and 29, 29' with corresponding structure of frame 31 which preferably lies generally in a vertical plane. A second frame 33 lying generally in a horizontal plane extends lengthwise under tank 13 for supporting the tank by means of tank support saddle members 35, 37 as explained in greater detail below.

Figure 3:
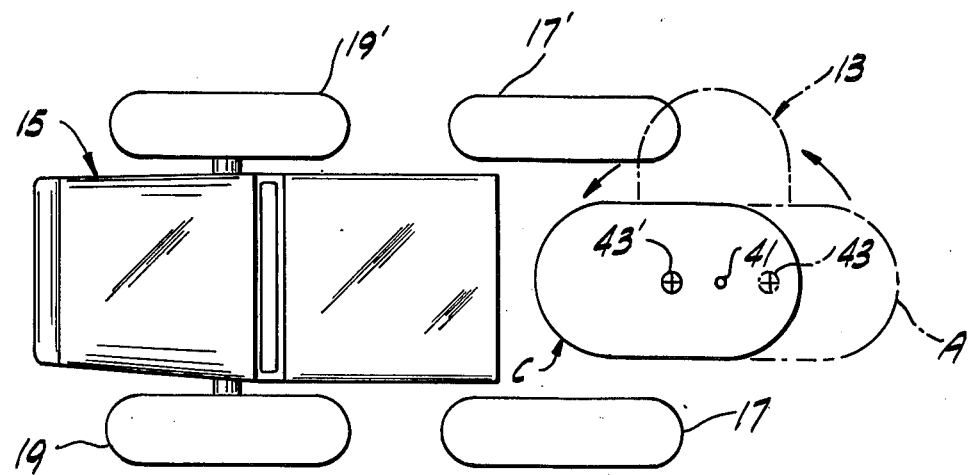
FIG. 3 is a simplified top elevation of the tractor and the tank and schmatically illustrating pivoting movement of the tank made possible by apparatus of the invention.

Indicated generally at 39 is a pivot assembly for supporting frame 3 from frame 31 for pivotal movement of frame 33 with respect to frame 31 about an upright, preferably vertical, pivot axis 41 (See FIG. 3). Pivot 39 thus permits rotation of tank 13 about axis 41 in a horizontal plane, as depicted schematically in FIG. 3.

FIG. 3 illustrates that the center of gravity 43 of tank 13 is spaced horizontally from the pivot axis 41. When the tank is mounted upon tractor 15, the tank center of gravity is located as shown, but is first positioned at 43' when the apparatus 11 and tank 13 are in the configuration illustrated in FIG. 1. The apparatus provides for relocating the center of gravity by rotating tank 13 about pivot axis 41 as more fully explained herein below.

When not secured to tractor hitch 25, frame members 31 and 33 of the new apparatus are supported by removable jack stands 43, 45 and 45' (See FIG. 4). As is apparent from FIG. 1, these three stands maintain frame 31 in position for engagement with hitch members 27, 29 and 29' for attachment of frame 31 to the hitch. Thus they support the apparatus when it is not lifted by the tractor hitch.

Referring to FIGS. 4-6, the detailed configuration of apparatus 11 is now shown in greater detail, the apparatus preferably constructed of steel elements welded or otherwise secured together as indicated.

Frame 31 includes a transverse lower frame member 47 of channel configuration carrying at each end a respective rectangular plate 49, 49' welded to member 47. Welded to the lower end of each of plates 49, 49' is a respective transverse pin 51, 51'. Said pins are thus carried at opposite ends of member 47 and are laterally spaced apart by a distance corresponding to that between hitch hook members 29, 29' so as to be engageable by them.

Extending vertically upward from member 47 and welded to the latter are four upright channel-shaped members 53, 53' and 55, 55', all lying in the same vertical plane. These are welded at their upper ends to a transverse upper frame member 57, again of channel configuration. Located proximate the upper ends and extending between upper members 53, 53' is a third transverse pin 59. Said pin 59 is transversely centered between pins 51, 51' and located above the latter by a distance appropriate for being engaged by the upper hitch hook 27.

The horizontal frame 31 is preferably of rectangular configuration. It is constructed of L-shaped frame members including first and second lengthwise side members 61 and 61'. A transverse end member 63 is pivotally secured to side members 61 and 61' as more fully explained later. An opposite transverse end member 65 is rigidly secured at its ends, as by welding, between the ends of side members 61, 61'. Each of frame members 61, 61' and 63, 63' lies in the same plane, which is ordinary horizontal except as explained later.

The pivot assembly 39 which pivotally secures frame 33 to frame 31 comprises a flat, disc-shaped plate 67 welded to the center of frame member 57. Plate 67 provides a bearing surface on its upper face against which the lower face of corresponding flat, disc-shaped plate 69 may bear rotationally. Plate 69 is welded centrally to the lower surface of transverse frame member 63.

Extending upright from plate 67 so as to provide vertical pivot axis 41 is a pivot pin 71 of circular cross-section. Plate 69 and frame member 63 are apertured for receiving pin 71 by having a bore 73 drilled therethrough of diameter closely approximating that of pin 71.

With reference now also to FIGS. 5 and 6, longitudinal frame members 61, 61' provide support for tank 13 by means of saddles generally designated 75 and 77 secured thereto. The saddles have respective curved strap-like or bight portions 79, 81 supported at the sides by respective upright members 83, 83' and 85, 85' carried by transverse bars 87 and 89, respectively, which extend between the upright members and under the curved lower surface of tank 13.

As shown in FIG. 4, frame members 61, 61' each have a plurality of transverse slots spaced at regular intervals along the inner margins thereof and proximate the ends of the frame members. Slots of members 61 are designated 91 and slots of member 61' are designated 91'. Each of the bars 87, 89 of the tank saddles is secured to frame members 61, 61' by a pair of bolts such as that designated at 93 in FIG. 5, which extend through each of pairs of corresponding opposed slots 91, 91'.

Because of the numerous pairs of spaced slots 91, 91', various sizes and lengths of tanks can be secured to and supported by frame 33. But, regardless of the length, the center of gravity of the tank will be located rearwardly from pivot axis 41 when the apparatus is not attached to the tractor hitch 25, that is, as shown standing free from the tractor 15 and supported by support stands 43 and 45, 45'. Thus, in FIG. 5, the center of gravity of the tank 13 is symbolically depicted at 43 and is there seen to be spaced between the ends of longitudinal frame member 61. The tank center of gravity is therefore positioned between the ends of the horizontal frame 33 and is, of course, centered laterally with respect to the frame 33, as illustrated in FIG. 6.

Accordingly, the support stands 43 and 45, 45' stably support the tank 13 when the apparatus is not attached to the tractor hitch because of the tripod arrangement. More specifically, support stands 45, 45' each comprise a respective short tubular leg member 95, 95' having a foot pad 97, 97' welded at the bottom. The legs are received at opposite sides of frame 31 in apertures 99, 99' of transverse frame member 47. The legs 95, 95' are maintained at a desired height by spring clip pins 101, 101' or the like which extend through transverse bores in the leg members.

The other support stand 43 similarly comprises a longer tubular leg member 103 having a foot pad 105 welded at the bottom end. The upper end fits into a socket 107 welded to transverse frame member 65, there being a set screw 109 or the like for retaining leg 103 in socket 107 if desired.

In using the apparatus, the tank 13 is secured to frame 33 as previously described but is not yet filled with herbicide, fertilizer or any other liquid because of the extreme weight which would be characteristic of a large amount of an aqueous liquid in the tank. For example, 500 gallons would weigh more than two tons. Yet the invention will permit the safe mounting of a tank containing such a heavy amount of liquid upon the tractor, when employed as described herein, without adversely effecting the weight distribution on the drive wheels of the tractor.

Figure 7:
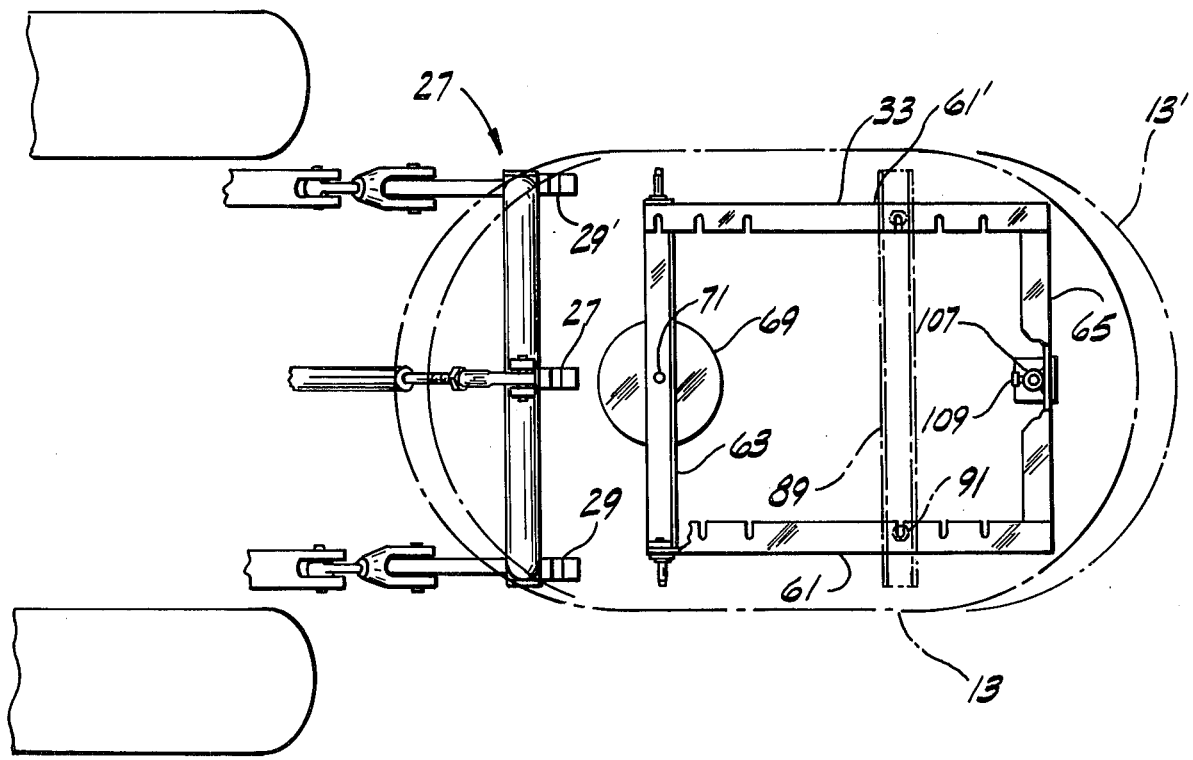
FIG. 7 is a top elevation of the new apparatus, partly broken away to illustrate certain pivot and support features, the tank being outlined in phantom to show selective positioning of its mounting upon the apparatus, and illustrating also the adjacent tractor hitch.

The tractor 15 with hitch 25 positioned as shown in FIGS. 1 and 7 is backed toward the new apparatus 11. When hitch hook members 27, 29 and 29' are positioned below the respective lifting pins 59, 51 and 51', the hitch is raised to engage the pins. As the hitch is raised further, frame 31 is lifted from the surface by an amount sufficient that front support stands 45, 45' may be removed. Alternatively, the support stands may be retracted by removing the spring clips 101, 101', raising the stands and the replacing the clips 101, 101' in alternative apertures in the tubular legs 95, 95' suitably located for retaining the legs in a raised position.

Figure 8:
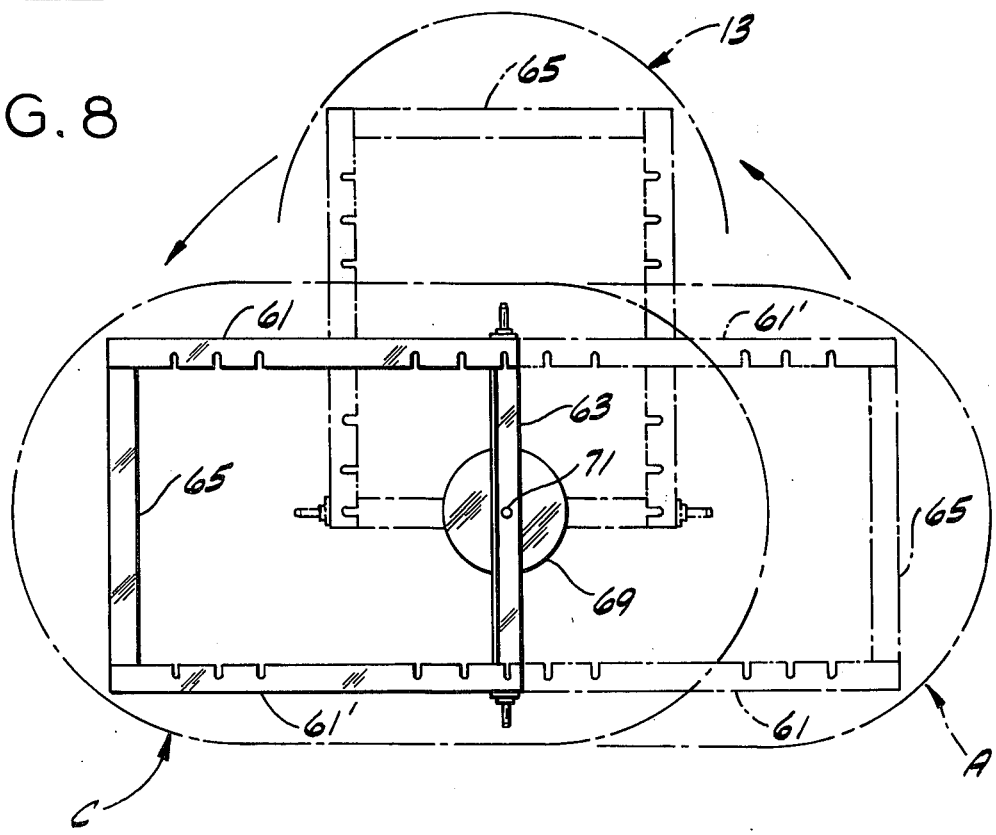
FIG. 8 is a pictorial representation in top elevation of the new apparatus, the tank being represented in phantom outlining, illustrating positions of the tank and frame structure of the apparatus when the apparatus has been picked up by the tractor hitch.
Figure 9:
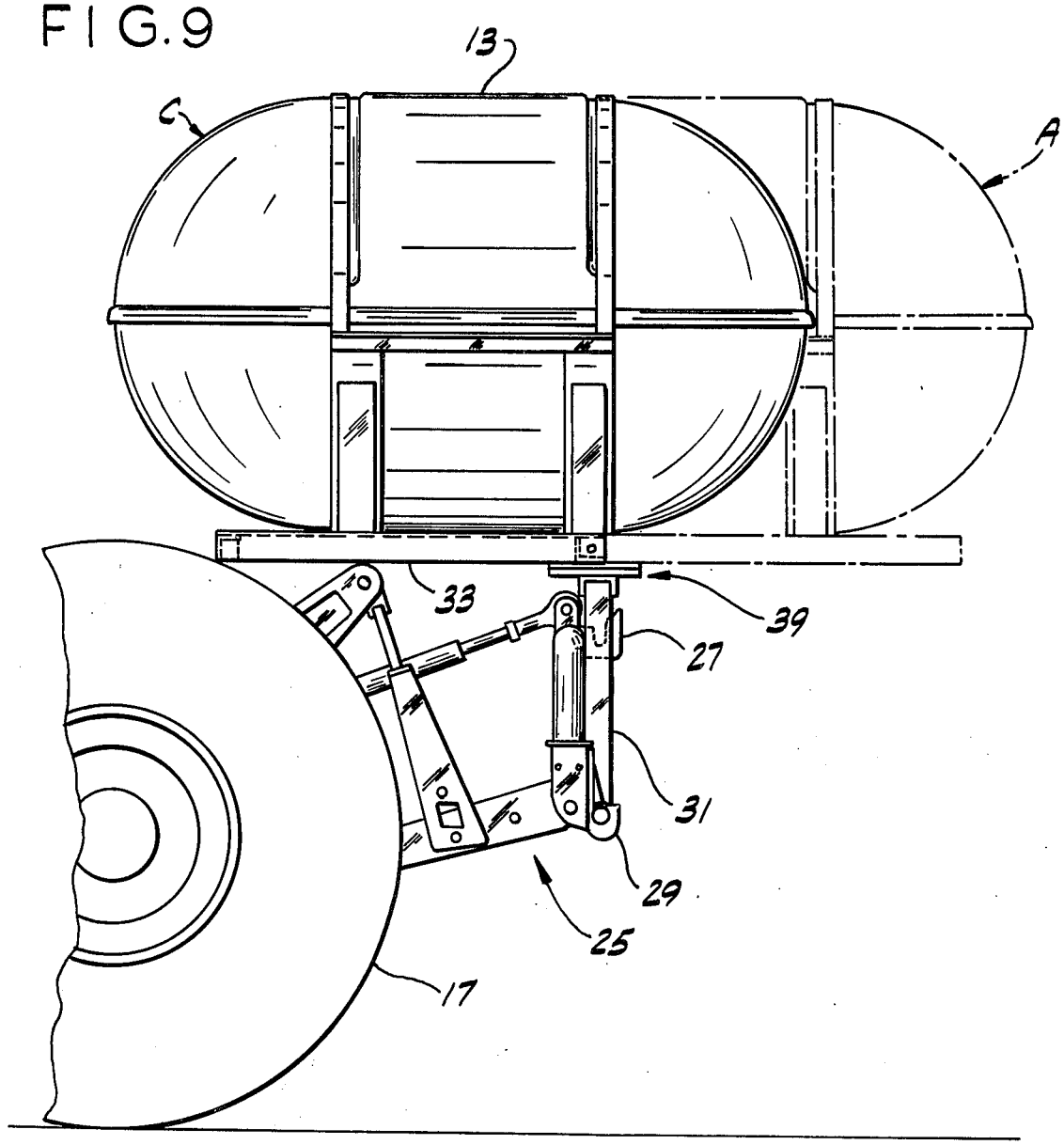
FIG. 9 is a side elevation of the new apparatus and such tank in mounted position upon the tractor with tank repositioning as indicated in FIG. 8 being depicted by phantom lines.

In this position of the hitch, the tank is as outlined by the phantom line A in FIGS. 3, 8 and 9. Preferably, support stand 43 is left in place for safety purposes.

Frame 33 with tank 13 secured to it is then rotated 90° about pivot axis to the position designated B in FIGS. 3 and 8. If not already fully raised, hitch is then elevated to the position generally as shown in FIG. 9. At this time, set screw 109 is loosened and support stand 43 is removed.

The tank and frame 33 are then rotated another 90° about pivot axis 41 to the position designated C in FIGS. 3, 8 and 9 wherein the center of gravity of tank 13 is now located at the position designated 43' (FIG. 3) forward of pivot axis 41.

Referring to FIG. 4, it is now desirable to interpose between the remote end (transverse member 65) of frame 33 and structure of the tractor, e.g., the rear axle housings 111, 111', a pair of auxiliary frame support members 113, 113'. There latter support members extend from opposite sides of the tractor axle structure to locations on transverse frame member 65 which are spaced at opposite sides of the frame. The support members 113, 113' are preferably of L-shaped lengths of steel which are bolted to brackets 115, 115' or the link welded or otherwise suitably secured to the tractor axle housing structure. Cross-braces as shown at 117 and 119 may be bolted to and extend between support members 113, 113' if desired. Their use is dependent entirely upon the specific configuration of tractor 15. As will be understood, four-wheel drive tractors of the present type are subject to considerable variance in design, so that the length and orientation of the support members 113, 113' must be selected appropriately.

The hitch is lowered by an amount sufficient to permit the upper ends of support members 113, 113' to be bolted to frame member 65. At this time, apparatus 15 is now configured for bearing the extreme weight of the tank 13 when fully filled, e.g., with more than two tons of liquid. Various valving and conduit arrangements (not shown) may interconnect tank 13 with appropriate spray apparatus.

In this configuration, the tank center of gravity is located well forward of the vertical frame 31 as well as the hitch lifting hooks 37, 29 and 29', as contrasted with prior art tank-mounting arrangements with which the tank center of gravity would be well rearward of the hitch lifting members. Hence, the rearward moment of the heavy spray tank 13 is minimized, contributing significantly to improved weight distribution between the front and rear driving wheels of the tractor. Accordingly, steering is greatly improved and the front wheels may pull their share of the load.

Figure 2:
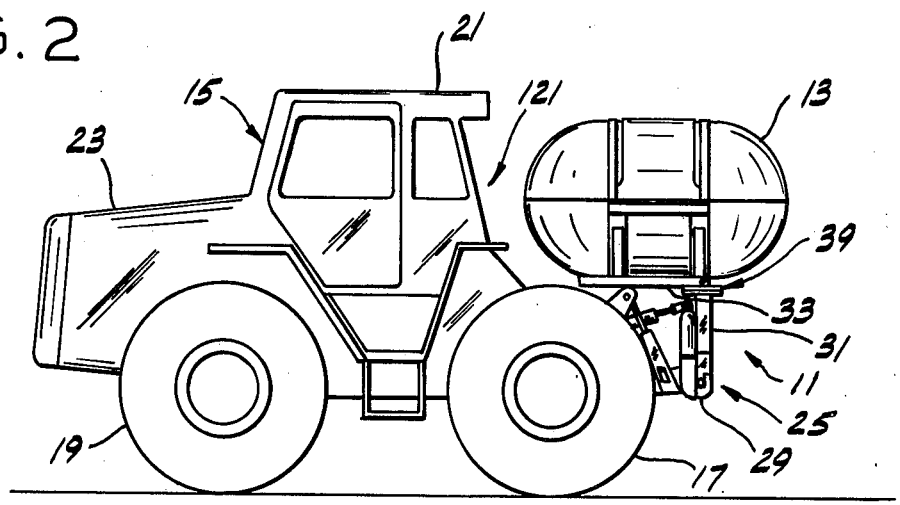
FIG. 2 is side elevation like FIG. 1 but illustrating the apparatus and tank supported thereon mounted upon the tractor.

To further improve the loading, the tank saddles 75, 77 are secured to frame 33 at a location which, when the tank is in position C (as shown in FIGS. 3 and 8), will cause the tank 13 to be as close to the tractor cab 21 as is practicable. FIG. 2 illustrates that tank 13 may be located quite closely to cab 21 so as to leave only a relatively small space 121 between the tank and cab. Optimal positions of tank 13 upon frame 33 are possible because of the spacing of securement slots 91, 91'. Thus, the tank may be located more rearwardly at the position, for example, designated 13' in FIG. 7 upon the frame for rotating closer to cab 21.

On some tractors, the rear wheels may be of relatively large diameter or be of such width or narrow tread between them that a rear wheel might be expected to interfere with movement of frame 33 and tank 13 secured thereto on movement from position B to position C (See FIG. 3). However, the present apparatus preferably includes provision for overcoming any difficulty which this would present.

Figure 10:
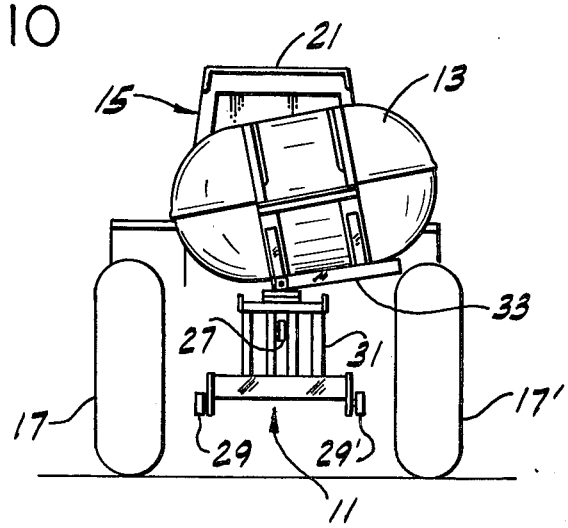
FIG. 10 is a simplified rear elevation view of a tractor and the new apparatus secured thereto illustrating tipping pivotal movement of a tank supported by the apparatus during mounting of the tank upon the tractor.

As illustrated in FIG. 10, frame 33 is secured to frame 31 in such a way as to permit the remote end of frame 33 (i.e., that end characterized by frame member 65) to be elevated, that is, lifted so as to clear the rear wheel 17' in movement from position B to position C. This is permitted by a pivotal attachment of longitudinal frame members 61, 61' to transverse frame member 63 (See FIG. 4) by means of bolts 123, 123' defining a horizontal pivot axis for frame 33. Thus, the end of frame 33 remote from this pivotal attachment may be raised as shown in FIG. 10.

In this regard it may be observed that the L-shaped transverse frame member 63 is oriented so that its upright web has an edge 125 spaced outwardly (or rearwardly, as the apparatus is viewed in FIG. 7) from the horizontal pivot axis which extends coaxially through bolts 123, 123'. Accordingly, this edge is engaged as shown at 127 in FIG. 4 by the transverse web portions of longitudinal frame members 61, 61'. Hence, frame 33 will normally be supported at a right angle to upright frame 31 but nevertheless may be tipped as shown in FIG. 10 for clearing the rear wheel.

To increase the lateral stability of tank 13 when in either of positions A or B, transverse member 57 of frame 31 is provided (See FIG. 4) with thin strips or shoulders 129, 129' at the sides of the top surface, these being of about the same thickness as plate 67. Referring to FIG. 4, these shoulders engage the lower surface of transverse member 63 of frame 33 to prevent excessive lateral rocking of frame 33 about the pivot assembly 29.

Various modifications of the pivot assembly 39 may also be made to enhance stability if desired, including the use of sleeve bearings or the like. Also, pivot pin 71 may be replaced by a bolt arrangement.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. Apparatus for mounting a fillable container upon a tractor having a lifting hitch extending from said tractor, said apparatus comprising means for securing said apparatus to said hitch for lifting of said apparatus by said hitch, means for supporting said container, and means for securing said supporting means to the first-said securing means in pivotal relationship about a pivot axis for permitting relocation of the center of gravity of said container from rearwardly of said pivot axis to forwardly of said pivot axis upon securing said apparatus to said hitch, thereby to minimize adverse effect of weight of said container, when filled, upon said tractor.

2. Apparatus for mounting a container upon a tractor having a lifting hitch extending from said tractor and said hitch being adapted to be raised or lowered, said apparatus comprising a first frame adapted for attachment to said hitch when lowered, a second frame for supporting said container with the center of gravity of said container positioned over said second frame, a pivot interconnecting said first and second frames for supporting said second frame from said first frame and permitting rotation of said second frame with respect to said first frame about an upright axis of rotation, said center of gravity being spaced horizontally from said axis of rotation, whereby said center of gravity may be relocated with respect to said hitch, when raised, upon rotation of said second frame about said axis of rotation.

3. Apparatus as defined in claim 2 and further characterized by said second frame being generally horizontal and extending lengthwise under said container, said center of gravity being positioned over the length of said second frame at a location spaced between the ends of said horizontal second frame, said pivot interconnecting said first frame to said second frame proximate one end of said second frame.

4. Apparatus as defined in claim 3, said hitch being a three-point hitch, said apparatus further characterized by said first frame being upright and providing three points of attachment to said hitch.

5. Apparatus as defined in claim 4, said hitch having lifiting hooks providing said three points for attachment to said hitch, said apparatus further characterized by said first frame having a plurality of frame members lying in a vertical plane, said frame members providing means for engagement and lifting by said hooks.

6. Apparatus as defined in claim 5 and further characterized by said means for engagement and lifting by said hooks comprising three transverse pins, said first frame comprising a transverse lower frame member, a transverse upper frame member, and a plurality of upright frame members extending between said lower and upper frame members, two of said transverse pins being carried at opposite ends of said lower frame member and a third said transverse pin extending between two said upright frame members, said pivot comprising a first and second cooperable pivot members, said first pivot member being carried by said upper frame member, said second frame including a transverse frame member carrying said second pivot member.

7. Apparatus as defined in claim 6 and further characterized by said first pivot member comprising a first pivot bearing surface including an upright pivot pin, said second pivot member comprising a second pivot bearing surface including an aperture for receiving said pivot pin, and said second bearing surface being adapted for bearing rotationally against said first bearing surface.

8. Apparatus as defined in claim 7 and further characterized by said first and second bearing surfaces each comprising a flat disc.

9. Apparatus as defined in claim 6 and further characterized by said second frame comprising first and second lengthwise members for carrying said container, said transverse frame member of said first frame extending between said lengthwise members at one end of said first frame, there being a further transverse frame member extending between said lengthwise members at the opposite end of said first frame, said center of gravity being located laterally between said lengthwise members and located lengthwise between said transverse frame members of said first frame.

10. Apparatus as defined in claim 9 and further characterized by said lengthwise frame members each being pivotally secured to the first-said transverse member of said second frame to provide a horizontal pivot axis for pivotal rotation about said horizontal pivot axis thereby to permit elevation of the end of said second frame remote from the first-said transverse member by rotation about said horizontal pivot axis.

11. Apparatus as defined in claim 3 and further characterized by said first frame and said pivot axis being vertical, said second frame being supported at a right angle to said first frame for rotation about said pivot axis in a horizontal plane.

12. Apparatus as defined in claim 3 and further characterized by means for supporting said apparatus when not lifted by said hitch.

13. Apparatus as defined in claim 12 and further characterized by said supporting means comprising a plurality of removable support members for maintaining said first frame in position for engagement by and attachment to said hitch.

14. Apparatus as defined in claim 13 and further characterized by said supporting members comprising a pair of removable support stands for supporting opposite sides of said first frame and at least a third support stand for supporting one end of said second frame remote from said pivot.

15. Apparatus as defined in claim 2, said hitch extending rearwardly from said tractor, said apparatus further characterized by said second frame being rotatable about said pivot axis from a position extending rearwardly from said pivot axis to a position extending forwardly from said pivot axis, whereby when said first frame is attached to said hitch, said center of gravity may be relocated from a position rearward of said hitch to a position forward of said hitch when raised.

16. Apparatus as defined in claim 15, said apparatus further characterized by said first frame having one end remote from said pivot axis, and remote end being locatable upon rotation of said frame about said pivot axis to a location forward of said hitch when raised, and means for supporting said frame remote end from structure of said tractor.

17. Apparatus as defined in claim 16 and further characterized by said means for supporting said frame remote end comprising a plurality of supports extending between axle structure of said tractor and said frame.

18. Apparatus as defined in claim 17 and further characterized by said plurality of supports comprising a pair of auxiliary frame members extending from opposite sides of said tractor axle structure to locations spaced oppositely on said frame at said remote end.

19. Apparatus as defined in claim 17 and further characterized by a plurality of removable support members for supporting said apparatus when not lifted by said hitch and for maintaining said first frame in position for engagement by and attachment to said hitch.

20. Apparatus as defined in claim 19 and further characterized by said removable support stands comprising a pair of support stands for supporting opposite sides of said first frame and a further support stand for supporting said remote end of said second frame.

21. Apparatus as defined in claim 2 and further characterized by said container comprising a tank, said tank having a curved lower surface, a saddle for carrying said curved lower surface, said saddle being secured to said second frame.

22. Apparatus as defined in claim 21 and further characterized by said second frame having a spaced pair elongated frame members, said saddle being adapted to be secured to said pair of frame members by fastening devices, said frame members each having a plurality of alternative locations for receiving said fastening devices, whereby said tank may be mounted in optimal position upon said second frame.

23. Apparatus for mounting a container upon a four-wheel drive tractor having a three-point lifting hitch by means of said hitch, said hitch extending rearwardly outward from said tractor, said apparatus comprising a horizontal frame adapted to extend horizontally lengthwise under said container for supporting said container with the center of gravity of said container positioned between the ends of said horizontal frame, a vertical frame including multiple points of attachment for attachment to said hitch, pivot means securing an upper end of said vertical frame to said horizontal frame at a location on said horizontal frame proximate one end thereof, with said center of gravity being at a position rearward of said vertical frame, said pivot means permitting pivoting of said horizontal frame in a horizontal plane with respect to said vertical frame for relocating said center of gravity to a position forward of said vertical frame, whereby, after attachment of said vertical support to said hitch and lifting thereof, said pivoting of said horizontal frames causing relocating of said center of gravity to a position forward from said vertical frame.

* * * * *